United States Patent

Kinberg

[15] 3,689,081
[45] Sept. 5, 1972

[54] SEALS

[72] Inventor: Ragnar Kinberg, Strada Val San Martino Inferiore 135/50, Turin, Italy

[22] Filed: Dec. 8, 1970

[21] Appl. No.: 96,230

Related U.S. Application Data

[63] Continuation-in-part of Ser. No. 799,170, Feb. 14, 1969, abandoned.

[52] U.S. Cl. ............... 277/1, 277/206 R, 308/187.1
[51] Int. Cl. ............................................. F16c 9/00
[58] Field of Search ............... 277/1, 206, 94, 152; 308/187.1

[56] References Cited

UNITED STATES PATENTS

| | | | |
|---|---|---|---|
| 2,878,084 | 3/1959 | Bermingham | 308/187.1 |
| 2,881,015 | 4/1959 | Wahl | 277/1 X |
| 3,203,740 | 8/1965 | Peick et al. | 277/94 X |
| 3,275,331 | 9/1966 | Mastrobattista et al. | 277/152 X |

FOREIGN PATENTS OR APPLICATIONS

| | | | |
|---|---|---|---|
| 852,993 | 11/1960 | Great Britain | 277/94 |

*Primary Examiner*—William F. O'Dea
*Assistant Examiner*—P. D. Ferguson
*Attorney*—Richard G. Sughrue et al.

[57] ABSTRACT

A seal is formed between two relatively rotatable parts by mounting a plastic sealing member such as an annular plate between the parts so that a tapered lip or lips at one periphery of the member contacts and is resiliently deformed by a relatively rotatable surface of one of the parts. Upon initial relative rotation of the parts, frictional heating causes permanent deformation and melting of each lip to form a seal having a small annular clearance or play at said surface.

3 Claims, 5 Drawing Figures

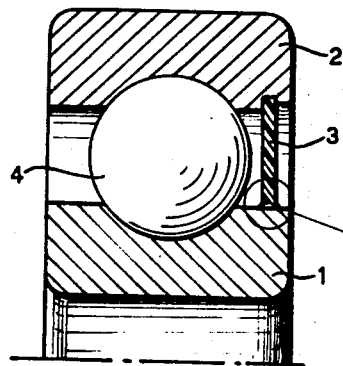
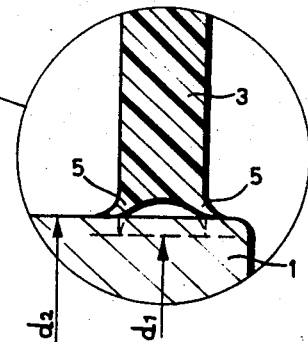
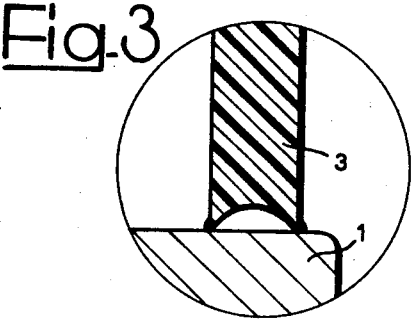
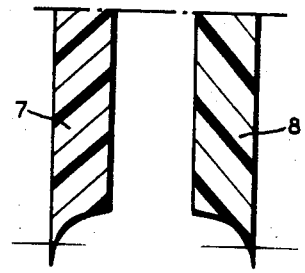
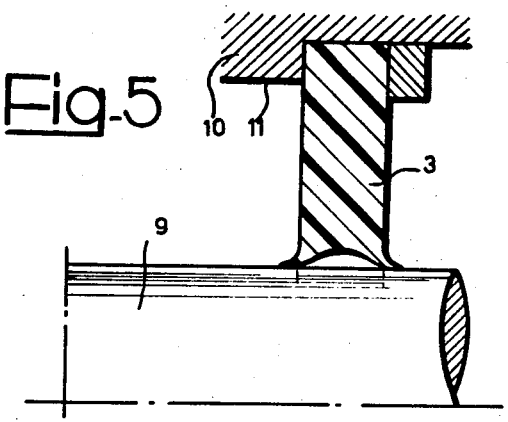

SEALS

REFERENCE TO RELATED APPLICATION

This application is a continuation-in-part application of parent application, Ser. No. 799,170, filed Feb. 14, 1969 and now abandoned.

SUMMARY OF THE INVENTION

This invention relates to a seal for sealing two relatively rotating parts, for example, the inner and outer race rings of an antifriction bearing, or a rotary shaft and surrounding support structure.

An object of the invention is to provide such a seal which is supported by one of the relatively rotating parts and leaves an extremely slight play with respect to the other part, thereby affording an effective protection against the passage of foreign bodies between the parts.

The seal according to the invention comprises an annular sealing member made of plastics and provided at one periphery with at least one tapered annular lip, the initial diameter of which is such that the member is an interference fit with a respective surface of one of the parts to be sealed, whereby upon assembly of the seal in its operative position a resilient deformation of each lip takes place to effect sealing at said surface.

The seal according to the invention does not engender high friction in use and can, moreover, be assembled without the necessity of high accuracy machining.

Each lip on the annular sealing member is resiliently deformed upon initial relative rotation of the two parts with which the seal is associated. This deformation impedes free rotation of the two parts to be sealed, and heat is generated frictionally at the contacting surfaces. As a result, each lip is heated until it melts at least partially at its tip. The lip consequently undergoes a partial shrinking and shaping, changing its form and size and, therefore, changing the diameter of the lip periphery until the contact with the relatively rotating part to be sealed ceases, leaving a small clearance or play.

Thereafter, normal operation of the seal takes place substantially without frictional contact and, therefore, without the generation of heat.

The resulting clearance or play at each lip is very small by reason of the way in which it is formed, thereby affording a high sealing efficiency. It is well known that the sealing efficiency of a seal is inversely proportional to the magnitude of the clearance or play between the sealing member and the part to be sealed thereby.

The present invention accordingly also provides a method of forming a seal between two relatively rotatable parts, characterized by mounting a sealing member of plastics between the parts, said member having at least one tapered annular lip on one periphery which, upon initially fitting the sealing member, is resiliently deformed at a relatively rotatable surface to be sealed, and effecting initial relative rotation of the parts to cause permanent deformation of each lip by frictional heating so as to form a seal of small annular clearance or play at said relatively rotatable surface.

An advantage of the present invention is that a small seal clearance is formed during the initial relative rotation of the parts to be sealed, without requiring accurate machining on manufacture of the seal; since such machining would necessarily have to be effected with extremely narrow tolerances, conventionally made seals of small clearance would be considerably more expensive than the seal according to the invention.

The sealing member may have plane parallel faces, each lip being formed at one side of the annular member and having a surface which is an effective continuation of one face of the annular member. Thus, the annular sealing member may have a pair of annular lips arranged symmetrically with respect to the radial plane of symmetry of the annular member. Such a seal is preferably employed in connection with antifriction bearings.

Alternatively, said lip or lips may be formed at the outer periphery of the annular sealing member, this being suitable, for example, for sealing rotary shafts and surrounding support structure.

Further characteristic features and advantages of the invention will be understood from the following description, referring by way of example to the accompanying drawings, wherein:

BRIEF DESCRIPTION OF THE DRAWINGS

FIG. 1 is a partial axial sectional view of an antifriction bearing provided with a seal according to one embodiment of the invention;

FIGS. 2 and 3 show on an enlarged scale a detail of the seal shown in FIG. 1 respectively before and after its initial running-in period;

FIG. 4 shows a pair of seals according to another embodiment of the invention suitable for sealing an antifriction bearing, and FIG. 5 is a partial axial sectional view showing a seal according to the invention employed for sealing a shaft and stationary structure surrounding the shaft.

FIG. 1 shows an anti-friction ball bearing in which the annular gap between an inner race ring 1 and an outer race ring 2 of the bearing is closed by a seal comprising an annular sealing plate 3 formed of a suitable heat deformable plastic material such as an appropriate type of polyurethane polyamide resin or synthetic rubber. Examples of plastic materials that are suitable for the plate 3 are set forth in the following table:

| Trade name of material | Manufacturer | Composition | Properties |
|---|---|---|---|
| Elastodur 68–198 | Firgat | Pure Polyurethane | Hardness: 75 to 98 SHORE-A |
| Elastodur –630 | Corso Brescia 62 Turin, Italy | Pure polyurethane | Elasticity: good Abrasion resistance: good |
| Elastollan –610 | | polyurethane and glass fiber | Tensile strength: high Friction coefficient: low Softening point: 120°C |
| Ultramid | B.A.S.F., Germany Italian agents S.A.S.E.A., Via Paolini 16, Turin, Italy | polyamide resin | Rockwell hardness Scale R 100 to 120 Tensile strength: high |
| Sniavitrid | Snia Viscosa, Milan agents in Turin: Cadauta Plastic Corso Orbàssano, 80 | Polyamide resin and glass fiber | Compression strength: good Oil proofness: excellent Friction coefficient: low Softening point: 130 to 135°C |
| Nitril-acryl rubber | Firgat Corso Brescia, 62 Turin, Italy | synthetic rubber | Hardness 75 –85 SHORE-A Tensile Strength: low Friction: mean Min eral oil proofness: excellent Softening point: 150°C |

The plate 3 fits at its outer periphery in a manner known per se in an annular groove cut in proximity to one side of the bearing in the face of the outer race ring 2 upon which the outer rolling track for the rolling elements, in this case, balls 4, of the bearing is provided.

The sealing plate 3 has plane parallel faces and is formed at its inner periphery with a pair of radially inwardly protruding lips 5 of tapered thickness, shown in broken outline in FIG. 2. The lips 5 are arranged symmetrically with respect to the radial plane of symmetry of the sealing plate 3. In their initial undeformed conditions the lips 5 have outer surfaces which are effective continuations of the faces of the annular plate 3.

The diameter $d_1$ of the bore defined by the radially inner tips of the lips 5 is substantially smaller than the diameter $d_2$ of the face of the inner race ring 1 in which the inner rolling track for the balls 4 is provided, so that the plate 3 is an interference fit on the ring 1. The difference between the diameters $d_1$ and $d_2$ may be of the order of 0.01 to 0.5 mm. On account of the difference between the diameters $d_1$ and $d_2$, the lips 5 undergo a resilient deformation upon assembly of the seal and are forced outwardly to the positions shown in FIG. 2 by full lines, in which the lips 5 are in sealing contact with the inner race ring 1. The contact between the lips 5 and the race ring 1 gives rise to friction upon initial operation of the bearing and to a consequent evolution of heat. This heat causes melting and deformation of the lips 5 at the tapered tips thereof, so that the tips 5 eventually take up a permanent set in the shape shown in FIG. 3, after an initial running-in period of the bearing. As a result of this a very small clearance then exists between the lips 5 and the facing surface of the inner race ring 1, and sliding contact between the lips 5 and the inner race ring 1 is thereafter avoided.

If desired, the seal may be made up of two parts, such as 7 and 8 as shown in FIG. 4, in place of the plate 3, each part 7, 8 having a respective lip and the parts being adjacent to each other. Alternatively, the seal may comprise a single part such as 7 or 8 with a single tapered lip, one surface of which is an effective continuation of a face of the respective part 7, 8.

FIG. 5 shows a rotary shaft 9 surrounded by a stationary cylindrical structure comprising a casing 10 provided in its inner face 11 turned towards the periphery of the shaft 9 with an annular groove accommodating the outer peripheral portion of a sealing plate 3 constituting a seal according to the invention.

It will be appreciated that the sealing plate 3 may alternatively be supported by the inner race ring 1 of the bearing of FIGS. 1 to 3 or by the rotary shaft 9 of FIG. 5, the lip or lips in this case being provided at the outer periphery of the plate tapering outwardly. In this case the outer diameter of the lips would be initially slightly larger than the diameter of the respective face of the outer race ring 2 of the bearing at the face 11 of the surrounding stationary structure respectively. The difference between the diameters in question may in this case also be of the order of 0.01 to 0.5 mm.

Obviously, both with the bearing shown in FIGS. 1 to 3 and with the shaft seal shown in FIG. 5 it is immaterial which of the relatively rotatable parts to be sealed, if either, is stationary and which is movable; moreover, if both parts rotate, it is immaterial whether they rotate in the same or in opposite directions.

It will be understood that constructional details of the embodiments specifically described and illustrated may be varied widely without departing from the scope of the invention as defined in the appended claims.

What is claimed is:

1. A method of forming a seal between two relatively rotatable parts, comprising the steps of mounting a plastics sealing member between the parts, said member having at least one tapered annular lip on one periphery which, upon initially fitting the sealing member is resiliently deformed at a relatively rotatable surface of one of the parts to be sealed, and effecting initial relative rotation of the parts to cause permanent deformation of each lip by frictional heating so as to form a seal of small annular clearance at said surface.

2. A method of forming a seal between two relatively rotatable parts, comprising the steps of mounting between the parts a sealing member of heat deformable plastic having at least one tapered annular lip on one end portion thereof such that the tapered lip is initially in tight engagement with and deformed by the surface of one of the parts and the other end portion of the sealing member is mounted on the other part, and effecting relative rotation of the parts to cause permanent deformation of the lip by frictional heating to a position wherein the lip is in closely spaced relation to the surface of said one part.

3. The method of claim 2 wherein the surface of said one part is curved, and the initial difference between the diameter of the periphery of said tapered lip and the diameter of said surface is between 0.01 mm and 0.5 mm.

* * * * *